United States Patent [19]
Dubois et al.

[11] Patent Number: 5,686,722
[45] Date of Patent: Nov. 11, 1997

[54] SELECTIVE WAVELENGTH IDENTIFICATION FRIEND OR FOE (SWIFF)

[75] Inventors: Jacques Dubois, Neufchatel; Sophie LaRochelle, Cap-Rouge, both of Canada

[73] Assignee: Her Majesty the Queen in right of Canada, as represented by the Minister of National Defence of Her Majesty's Canadian Government, Ottawa, Canada

[21] Appl. No.: 608,334

[22] Filed: Feb. 28, 1996

[51] Int. Cl.⁶ ............................................. G01J 3/50
[52] U.S. Cl. ..................... 250/226; 250/203.2; 359/154; 342/45
[58] Field of Search .................... 250/226, 205, 250/203.1, 203.2, 203.6; 359/170, 169, 168, 181, 182, 152, 154, 157; 342/45, 42–44, 54; 356/152.3, 27, 28

[56] References Cited

U.S. PATENT DOCUMENTS

| | | | |
|---|---|---|---|
| 3,721,950 | 3/1973 | Jorgensen et al. | 367/2 |
| 3,989,942 | 11/1976 | Waddoups | 359/170 |
| 4,134,008 | 1/1979 | de Corlieu et al. | 359/170 |
| 4,143,263 | 3/1979 | Eichweber | 359/170 |
| 4,249,265 | 2/1981 | Coester | 359/170 |
| 4,361,911 | 11/1982 | Buser et al. | 359/169 |
| 4,694,297 | 9/1987 | Sewards | 342/45 |
| 4,731,879 | 3/1988 | Sepp et al. | 359/169 |
| 4,763,361 | 8/1988 | Honeycutt et al. | 359/156 |
| 4,851,849 | 7/1989 | Albersdoerfer | 342/43 |
| 5,001,488 | 3/1991 | Joguet | 342/45 |
| 5,274,379 | 12/1993 | Carbonneau et al. | 342/45 |
| 5,299,227 | 3/1994 | Rose | 342/45 |

*Primary Examiner*—Que Le
*Attorney, Agent, or Firm*—Larson and Taylor

[57] ABSTRACT

An optical identification friend-or-foe (IFF) system for vehicles comprises a Selective Wavelength IFF (SWIFF) system with a tunable optical beacon being located on each similarly equipped vehicle. That tunable optical beacon includes a light source and wavelength encoder which can select a number of narrow-band optical wavelengths for emission from the beacon, those selected wavelengths forming an identification code for a vehicle. The optical beacon directs the selected wavelengths along an optical path to a diffuser which can irradiate a wide field-of-view around the vehicle with those selected wavelength for detection and identification by other friendly vehicles. The light source may be one that emits a broad range of wavelengths with the encoder providing a number of narrow-band optical filters which can be selectively positioned in the optical path from the light source to the diffuser. Alternatively, the light source and encoder could be a wavelength agile laser source or an array of laser diodes emitting at specific wavelengths and a control unit to select the wavelengths emitted by the laser source or array of diodes. This optical SWIFF system provides a high level of covertness and degree of confidence in the identification of vehicles as being friend-or-foe.

20 Claims, 4 Drawing Sheets

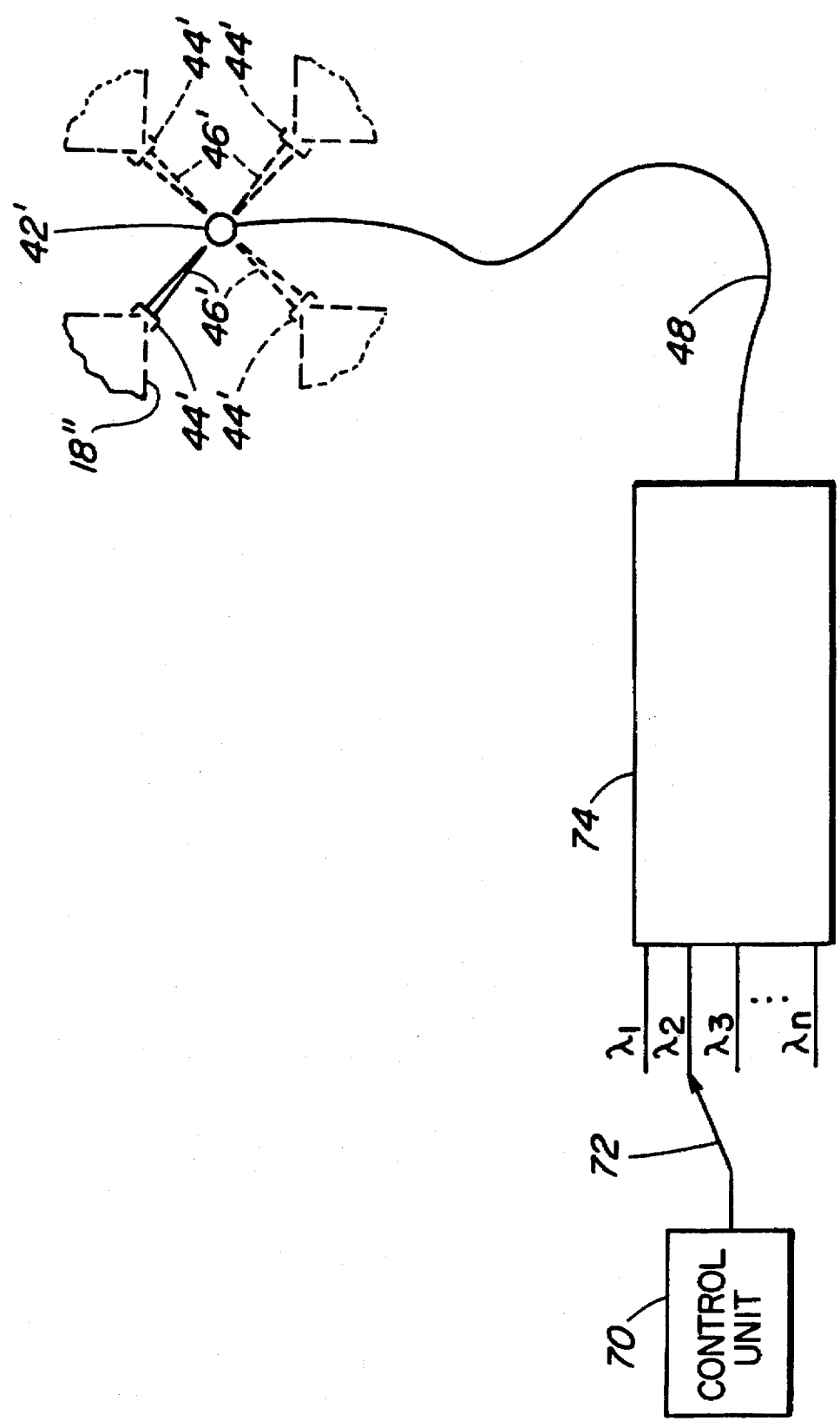

5,686,722

SELECTIVE WAVELENGTH IDENTIFICATION FRIEND OR FOE (SWIFF)

FIELD OF THE INVENTION

The invention relates to identification friend-or-foe (IFF) systems and in particular to optical IFF systems in which a tunable optical beacon unit in a vehicle can transmit a selective wavelength coded optical signal for detection by other, similar equipped, friendly vehicles in order to provide a positive identification to those other vehicles. The optical beacon units in these vehicles may be operated continuously or activated by an interrogation laser beam from another vehicle which transmits a low power coded laser beam towards a target vehicle that, in the case a friendly target, would be equipped with a panoramic detector and decoder for the laser beam to verify a valid code. The detection and identification of a valid code would then activate the tunable optical beacon unit in the target vehicle.

BACKGROUND OF THE INVENTION

One of the problems that face military platform commanders on a modern battlefield is to positively identify potential targets as being friend-or-foe when one is detected which is within range of a commander's weapon systems. That identification of friend-or-foe targets presents a very difficult decision for a commander of a military platform, such as a tank, who must decide in a split-second as to whether or not a detected target should be engaged while, at the same time, attempting to minimize any possibility of fratricide killing. This problem is rendered even more complex by the proliferation of military equipment which could result in possible conflicts between nations using similar military platforms. Therefore, visual assessments of potential targets is no longer a reliable method of identification for military platforms. Furthermore, technical advances have increased the range and accuracy of weapon systems which increases the difficulty of accurately identifying targets. This problem also exists for air-to-ground combat scenarios as well as ground-to-ground engagements.

No current systems exist which provide reliable, rapid and positive friend-or-foe identification for military platforms on modern land battlefields. Commanders often still rely on low-resolution visual and infrared images to determine if detected targets, be they tanks or other support vehicles, are enemy ones or not. That information may possibly be supported by information derived from a radio network. However, this is not always possible since commanders often have to operate under radio silence in order to avoid being detected by an enemy. In the case of Infrared (IR) imagers, the identification of land vehicles is not straight forward even with the most sophisticated thermal viewers. The IR signatures of land vehicles observed by these type of thermal viewers are dependent, to a very large degree, on uncontrollable factors such as the time a vehicle's engine has been running, the time a vehicle has been exposed to direct sunlight, etc. These factors make it difficult to determine if the observed IR signature from a vehicle is that of a friend-or-foe military platform.

Several different types of systems have been previously proposed to perform identification friend-or-foe (IFF) functions, most of which are based on radar or radio technology and a few on electro-optical technology. However, none of these systems have managed to satisfactorily meet the reliability requirements necessary for the type of operations envisaged while, at the same time, remaining covert and secure from observation by enemy forces. Among known IFF systems, some are purely passive and just provide distinctive passive features for interrogation vehicles to identify while others are considered to be active since they have to emit a signal to provide adequate identification. These active IFF systems can be based on a transponder that emits a signal which should only be detectable by a friendly platform and may also involve an interrogator and responder for each platform in order to perform active-cooperative identification.

One known IFF technique is for a vehicle to carry a transponder that emits a coded return signal when an interrogating radar pulse is detected by its receiver. U.S. Pat. No. 4,851,849 by Otto Albersdoerfer describes one such active system while another type of IFF system, one which does not require an active transponder, is described in U.S. Pat. No. 4,694,297 by Alan Sewards. The IFF system described in U.S. Pat. No. 4,694,297 only requires an antenna on a target vehicle which can re-radiate or reflect a radar beam and modulate that re-radiated beam in a distinctive manner. This latter system is based on the idea that an illuminating radar source would only detect a small reflected signal from a good antenna which is terminated in a matched load. However, all of the energy intercepted by that antenna will be re-radiated when the antenna terminating impedance provides a short circuit. A substantial reflected signal would then be created which could be detected by the source of the illuminating radar beam. Therefore, an antenna on a target vehicle with a variable termination impedance can modulate a re-radiated radar beam back to the radar source and, as a result, provide an identification signal to the source with that passively reflected radar beam being modulated with the code of the day.

An active/cooperative electro-optical IFF system is described in U.S. Pat. No. 5,274,379 by R. Carbonneau et al. In this system, each friendly vehicle is provided with a narrow-beam laser transmitter and a receiver with a panoramic detector for a transmitted coded laser beam originating from an interrogating vehicle. If a vehicle detects a coded interrogating laser beam and identifies the code transmitted as being from a friendly source, it provides an unblocking signal to a blocking means surrounding a rotating retro-reflector to clear a transmission path so that the retro-reflector will reflect the interrogating laser beam back to the source, where it can be identified by a narrow field-of-view detector of the interrogator. A further modulation is added to the reflected beam to identify the interrogated vehicle as being friendly. If a laser beam is detected from a source without a valid code being identified, the blocking means does not clear the transmission path preventing reflection of that beam by the retro-reflector and a warning is sent to the commander of the vehicle that an unfriendly laser transmission has been detected by the vehicle.

SUMMARY OF THE INVENTION

It is an object of the present invention to provide an identification friend-or-foe system for vehicles based on the use of a selective wavelength optical beacon to provide a wavelength coded identification signal to other vehicles, which system is covert and provides a high level of confidence in the identification of target vehicles under investigation as being friend-or-foe.

An optical identification friend-or-foe system for vehicles according to the present invention comprises a selective wavelength tunable optical beacon located on the vehicles, wherein the tunable optical beacon for one vehicle includes a light source and wavelength encoder with means to select narrow-band wavelengths from the light source for emission from the beacon, which selected wavelengths form an identification code for said one vehicle, and means to direct said selected wavelengths from said light source and wavelength encoder to a diffuser, the diffuser having means to irradiate a wide field-of-view around said one vehicle with those selected wavelengths.

An optical identification friend-or-foe system for vehicles according to one embodiment of the present invention comprises a selective wavelength tunable optical beacon for one vehicle, which beacon includes a light source and wavelength encoder with means to select narrow-band wavelengths from the light source for emission from the beacon, which selected wavelengths form an identification code for said one vehicle. In this particular embodiment, the light source is one that emits a broad continuous range of wavelengths and the means to select narrow-band wavelengths is said encoder having means to form a number of narrow-band optical filters with means to position selective optical filters in an optical path for a light beam from said source and a means to direct said narrow-band wavelengths to a diffuser, that diffuser having means to irradiate a wide field-of-view around said one vehicle with those selected wavelengths.

An optical identification friend-or-foe system for vehicles according to a preferred embodiment of the invention, as described above, is the encoder being in the form of a disk and the means to form a number of narrow-beam optical filters is a number of individual rotatable concentric annular rings in the disk, each ring containing a number of narrow-band optical filters that can be individually positioned in said optical path by rotation of a ring, a number of said annular rings being located in said optical path whereby a selected number of selected optical filters can be positioned in said optical path. In another embodiment of the invention, the means to form a number of narrow-band optical filter is a linearly variable optical filter and an adjacent superimposed liquid crystal display which are positioned in said optical path, wherein the liquid crystal display can form a selected number of transparent slit apertures at selected positions above the linearly variable optical filter to transmit selected narrow-band wavelengths.

BRIEF DESCRIPTION OF THE DRAWINGS

The following detailed description of the invention will be more readily understood when considered in conjunction with the accompanying drawings, in which:

FIG. 4 illustrates a SWIFF system according to a still further embodiment of the present invention.

DESCRIPTION OF THE PREFERRED EMBODIMENTS

Figure 1:
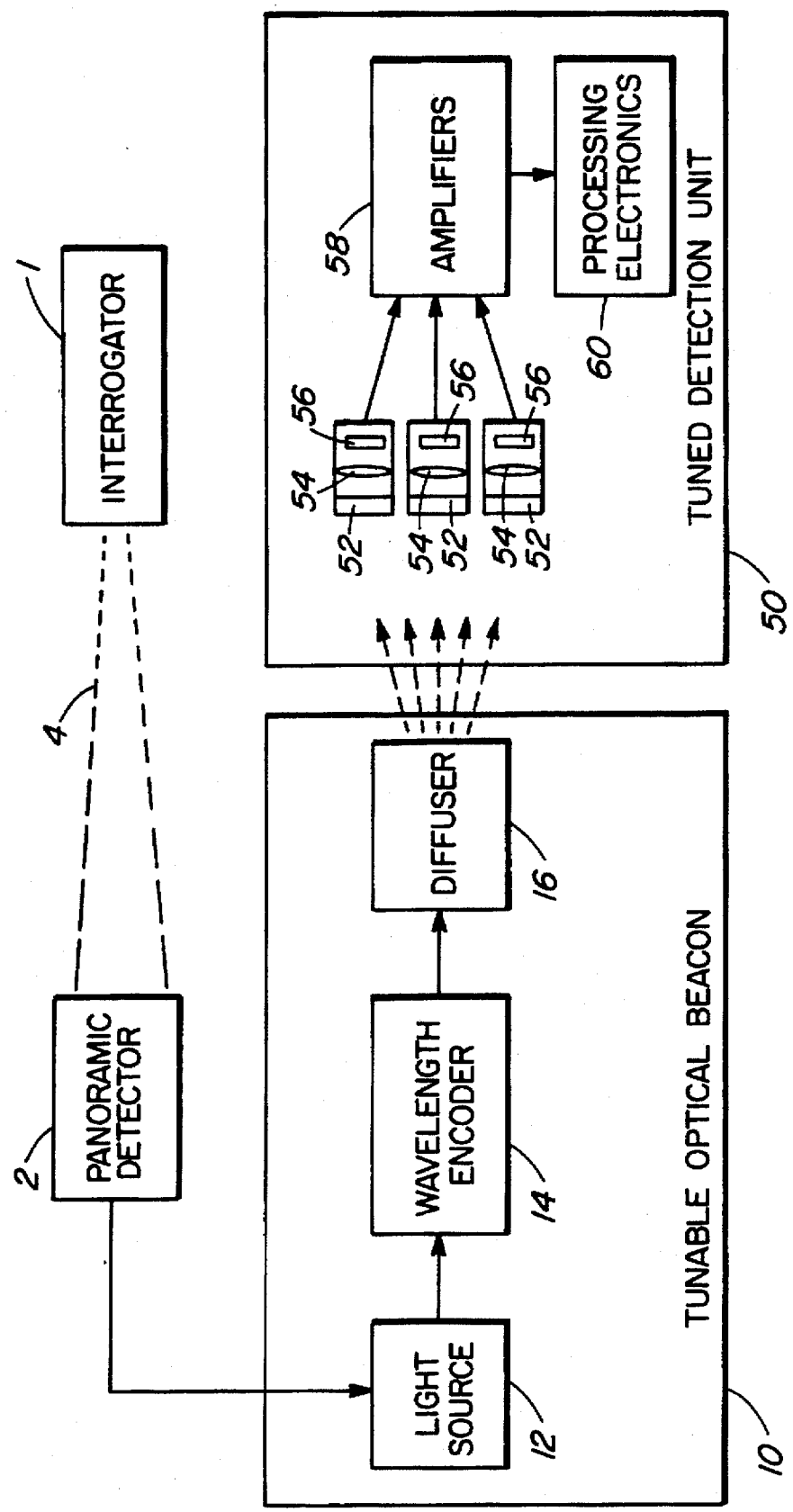
FIG. 1 is a block diagram that illustrates a basic Selective Wavelength Identification Friend-or-Foe (SWIFF) system according to the present invention.

The basic principle of an electro-optical Selective Wavelength Identification Friend-or-Foe (SWIFF) system for military platforms according to the present invention is illustrated in the block diagram of FIG. 1. This basic SWIFF system depends on each friendly vehicle being provided with a tunable optical beacon 10 and a tuned detection unit 50. The tunable optical beacon 10 consists of a light source 12 which is capable of producing light, either within a broad continuous range of wavelengths or within multiple well defined narrow spectral bands, and a wavelength encoder 14 that controls the set of narrow spectral bands emitted from the beacon and selected from light emitted by source 12. Those selected spectral bands which are allowed to be transmitted by the wavelength encoder 14 are directed to a diffuser 16 on the military platform which homogeneously irradiates a wide field-of-view (FOV) surrounding the platform. The detection unit 50 in a vehicle, each friendly military platform having a tunable optical beacon 10 and detection unit 50, consists of a series of photodetectors 56 which are each coupled to a lens 54 and a narrow-band optical filter 52. Each of the optical filters 52 match one of the narrow spectral bands of emission from diffuser 16 to provide a separate channel for each of those narrow spectral bands. In the case illustrated in FIG. 1, three separate channels are provided where each channel represents a single narrow spectral band, those three bands providing a spectral code (3 selective wavelengths) to identify friendly vehicles to each other. The signal generated by each photodetector 56 in each of the channels is applied, via amplifiers 58, to an electronic processing unit 60 for processing and to determine the validity of the selective wavelength code emitted by an optical beacon 10 in other vehicles so that the friend-or-foe status of each target vehicle can be established.

It should be noted that the tunable optical beacon 10 can be either operated continuously or be activated by a target vehicle following the detection of a valid coded signal from an interrogating coded laser beam transmitted from another vehicle. This latter is the most convert and secure approach and, when followed, will require an interrogation source 1 in an interrogating vehicle to transmit a coded beam 4 and a panoramic detector 2 on the vehicle being interrogated. The interrogation source 1, for instance a narrow-beam coded laser transmitter, is used to initiate the identification process whereas the panoramic detector 2 in a target vehicle detects the interrogation beam 4 and validates the interrogation code to activate the tunable optical beacon 10. The following description of several embodiments of the invention are directed to the type of IFF system where an interrogation coded signal is utilized.

An identification Friend-or-Foe system according to the present invention assumes that each friendly military platform is equipped with a similar SWIFF system and operates in the following manner. The operator of a military platform will first activate a laser interrogation transmitter 1 when a potential target is to be engaged in order to project a well collimated low power coded laser beam in the direction of the target. This narrow laser beam will only irradiate the target vehicle area and may form part of the same system as a laser rangefinder. If the target vehicle is unfriendly, it will be unable to detect the coded interrogation signal to any degree since that signal consists of narrow band light pulses of extremely low irradiance. In this situation, the unfriendly target vehicle will not be able to identify the code in the interrogation beam and no valid identification signal would be emitted to be picked up by the detection unit of the interrogating vehicle. A friendly target which is also equipped with a SWIFF system, on the other hand, will be able to detect the interrogation signal with its panoramic detector 2 and verify the interrogation signal's validity. If the code is not a valid code of the day, a warning will be sent to inform the vehicle's commander that an unfriendly interrogation took place. If a valid code is identified by the target vehicle, its tunable optical beacon 10 will be activated and emit the selected wavelengths of the code for the day to identify itself as being friendly. That code may also include modulation of the Pulse Repetition Frequency (PRF) or pulse width with a pre-programmed information code. The narrow FOV detection unit 50 of the interrogator, which knows the wavelengths code of the day, would detect the emitted signal from the target and verify the validity of the identification code and then inform the interrogator's commander that a friendly target is being engaged once a valid code is identified.

Figure 2:
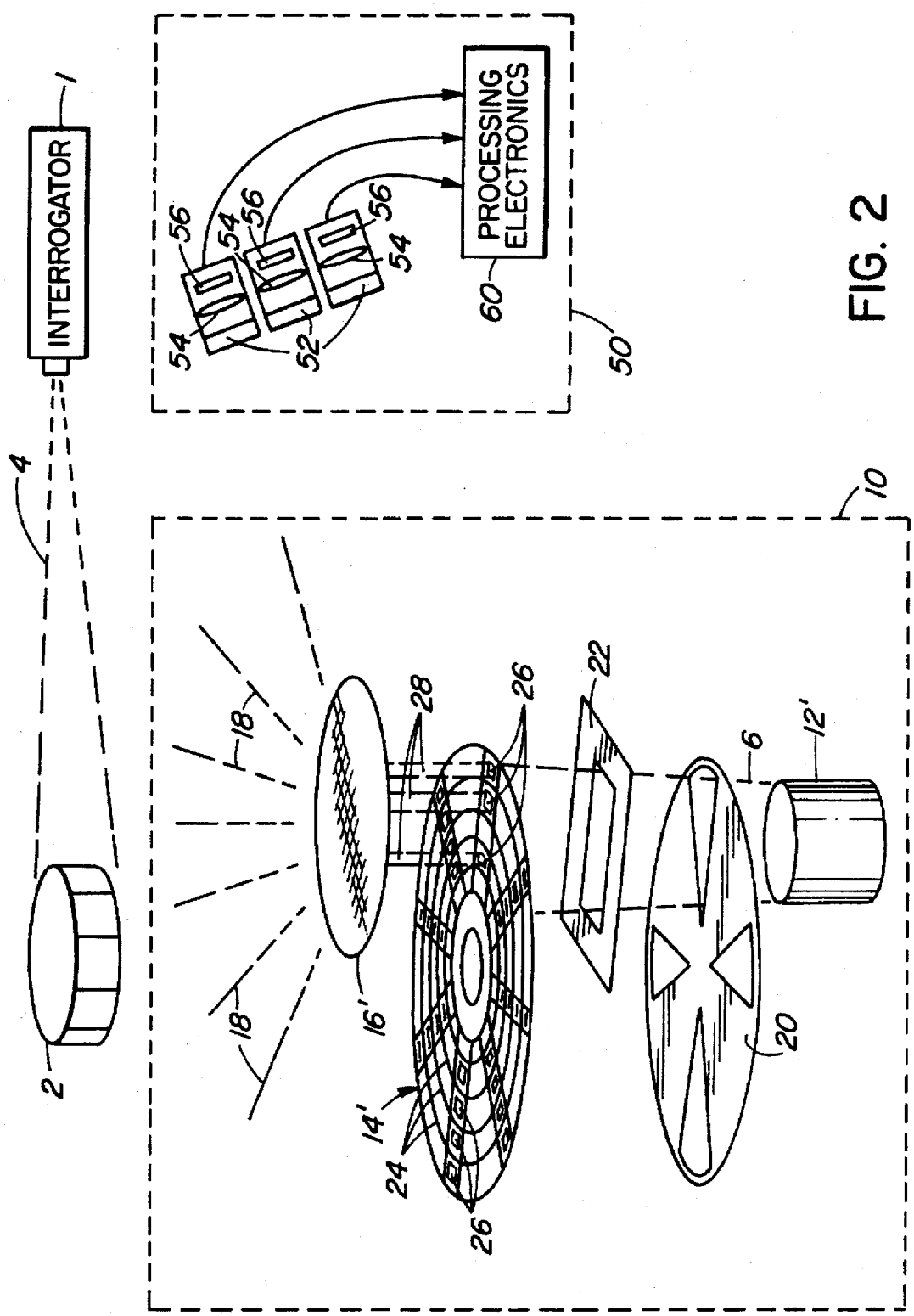
FIG. 2 illustrates a SWIFF system according to one embodiment of the present invention.

One embodiment of a SWIFF system according to the present invention is illustrated in FIG. 2. In this embodiment, the interrogating military platform includes a solid state laser transmitter 1 producing a well collimated laser beam 4, preferably operating at an eyesafe wavelength of around 1.55 µ, and a narrow FOV tuned detection unit 50 which is aimed in the same direction as the laser transmitter. The transmission from laser transmitter 1 is coded either by generating a sequence of pulses representing a binary number (a code of the day) by modulating the amplitude of the beam or by modulating the pulse repetition frequency or the pulse width with a pre-programmed information code. The narrow FOV detection unit 50 for each vehicle, according to the embodiment shown, consists of a series of photodetectors 56 which are each fitted with a narrow band optical filter 52 for a specific wavelength and a lens 54. This arrangement provides a separate channel from the photodetectors for each of the selected (narrow-band) wavelengths chosen for the code of the day identification. Those filters 52 can then be changed at will to identify different codes when such is required.

The panoramic detector 2 for each vehicle is of conventional design and could be based on a series of photodetectors covering each sector of the 360° FOV in azimuth in order to detect interrogating laser beams transmitters by other vehicles from any direction. These photodetectors could be fitted with narrow band optical filters that match the wavelength of emission from laser 1 of friendly interrogating sources. The previously mentioned U.S. Pat. No. 5,274,379 describes several other types of panoramic detectors which could be used for detecting transmissions from any direction around the horizon. The panoramic detector according to this embodiment would also include electronic circuits (not shown) to analyze and process detected signals for validity and to energize the tunable optical beacon 10 in a vehicle when a valid interrogation signal is detected. The panoramic detector may also have means to determine the direction of arrival of an interrogating beam and control a switching mechanism for the optical beacon which limits emissions from the beacon towards the direction of the source of that interrogating beam.

The tunable optical beacon 10 in each vehicle is built around a light source 12, such as an xenon lamp that would be coupled to some reflective optics so that most of its energy output is directed in a desired direction. The xenon light source 12' shown in FIG. 2 could be directly pulsed or its output beam 6 could be simply fed through a light chopper 20 to generate a modulation of the generated light beam in order to facilitate detection of an emitted signal. That modulated light beam is then passed through a wideband blocking filter 22 to keep only the spectral regions of interest, for example the Infrared (IR) region. After beam 6 passes through filter 22, the spectral regions of interest are directed to a wavelength encoder 14' which allows the selection and transmission of one or more narrow spectral bands 28, forming a selective wavelength code of the day, that are then directed to a diffuser 16' which causes the combined selective wavelengths to irradiate areas by diffused light 18 in all directions around the vehicle.

The wavelength encoder 14' illustrated in FIG. 2 is in the form of a rotatable disk that is made up of a number of individually rotatable concentric annular flat opaque rings 24 that, when combined, form a disk 14'. Each of the annular flat rings 24 contain a series of narrow band optical filters 26 which allow specific wavelength of light from light source 12' to be transmitted through and emitted from encoder 14'. The annular rings 24 can be individually rotated to select and place a particular optical filter 26 in the path of the light beam in order to produce a number of combinations of wavelengths, i.e. narrow spectral beams 28, which are transmitted to diffuser 16'. Furthermore, the whole disk assembly 14' can be rotated to produce sequentially wavelength coded words. The wavelength coded light beams 28 so generated and transmitted by the wavelength encoder 14' are then projected towards the diffuser 16' which causes the combined light beams 28 to irradiate areas in all directions around the vehicle containing that diffuser 16'. That diffuser 16' may be formed of a number of diffusers that direct diffused light in different directions as will be explained in further embodiments of the invention. The narrow spectral bands of light 28 which are combined and spread by diffuser 16' can then be detected by one or more of the channels in a narrow FOV detector 50 of other vehicles and analyzed for validity by processing electronics 60.

Figure 3:
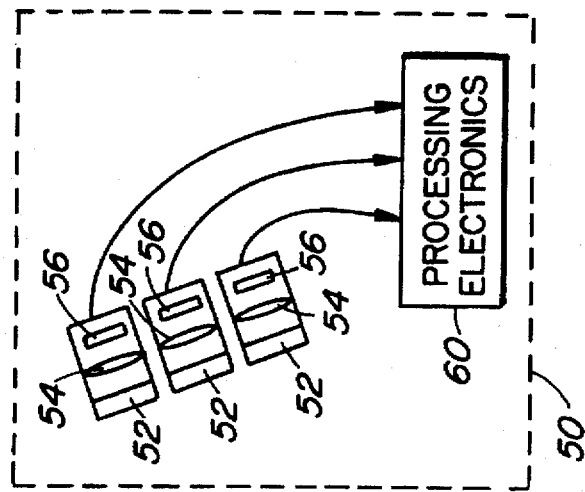
FIG. 3 illustrates a SWIFF system according to another embodiment of the present invention.
Figure 3:
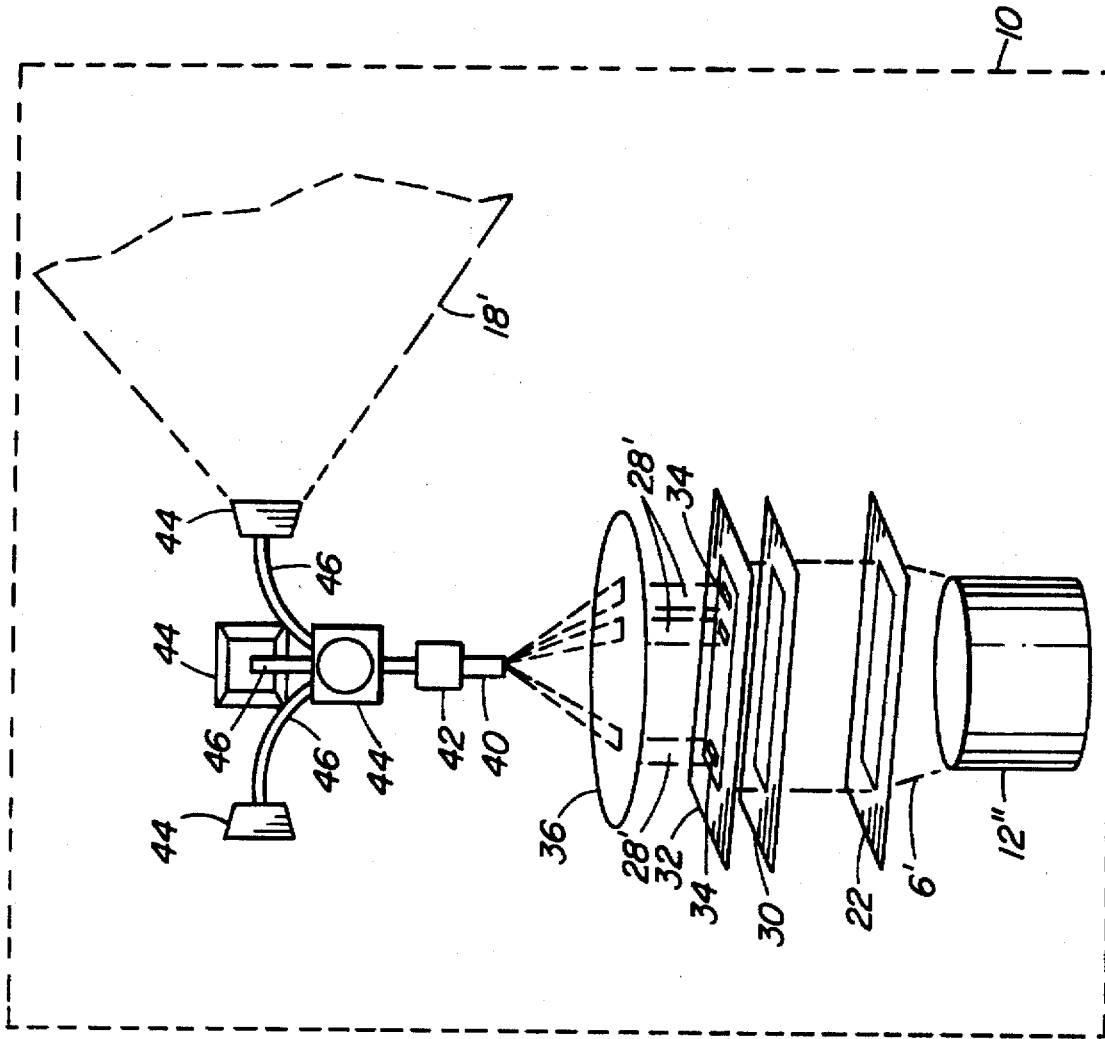

Another embodiment of the present invention is illustrated in FIG. 3 wherein the wavelength encoder disk 14' shown in FIG. 2 is replaced by a linearly variable optical filter 30 combined with a Liquid Crystal Display (LCD) 32. The linearly variable optical filter 30 is placed in the path of the light beam 6' after it transverses blocking filter 22 and the LCD 32, which can form various transparent slit apertures 34 at different positions, is positioned directly above the filter 30 in the path of any light that transverses through filter 30. The linearly variable optical filter 30 has the property that it passes different wavelengths of light as a function of the position on the filter along its length. The LCD 32 over filter 30 can selectively form one or more transparent slit apertures 34 at various positions along its length to allow light from only those positions above the filter to be transmitted to a lens 36 and then to a diffuser. Since the slit apertures 34 can be selectively formed at any position along LCD 32, they can form a bar code above filter 30 to allow only particular wavelengths corresponding to the desired code to be transmitted to lens 36. The set of narrow-band wavelengths 28' allowed to be transmitted through filter 30 and LCD 32, i.e. in order to form a code for identification purposes, can be easily varied in real time to produce a sequence of wavelength coded words varying to infinity. The number of different codes that can be produced by this type of arrangement is extremely high so that it would not only be possible to produce a code of the day to identify a target vehicle, or platform, as a friend but to also encode the complete identification (type of platform, country, unit, etc.) for that particular platform.

The selective wavelength coded beams 28' formed by the linearly variable optical filter 30 and LCD 32, from beam 6' in FIG. 3, can be projected onto a diffuser as shown in FIG. 2 or directed to a lens 36 which focuses the beams 28' onto an optical fiber bundle 40 for delivery by individual fibers 46 to one or more small diffuser heads 44 that spread the beam (one of combined wavelengths) from the fibers to cover a 360° wide field-of-view (FOV). In the embodiment illustrated in FIG. 3, each optical fiber 46 from bundle 40 is connected to one of four diffuser heads 44. Each diffuser head 44 spreads the combined beam from each fiber through a 90° FOV with those four heads 44 being arranged at 90° to each other. To optimize the direction of diffusion as a function of the direction of arrival of an interrogating beam 4 from an interrogation source 1 as determined by a panoramic detector 2 (see FIGS. 1 or 2), a switching mechanism 42 can be included in the fiber bundle 40 to direct the light beams, emitted by the encoder and focused by lens 36 onto the bundle, to only one of the fibers and to the appropriate emitting head 44. The switching mechanism 42, which is controlled by the panoramic detector, could be either an optical or mechanical type and may possibly only block transmission to other optical fibers. In the embodiment of the invention described with respect to FIG. 3, the narrow FOV detector 50 for each platform is similar to the one shown in FIG. 2 which was previously described.

A further embodiment of the invention is illustrated in FIG. 4 wherein the source of white light (12' or 12") and the wavelength coding mechanism (disk 14' or linearly variable filter 30 and LCD 32) in the previously described embodiments are replaced by either a wavelength agile laser source or an array of laser diodes 74 emitting at specific wavelengths and a control unit 70. In the case of a wavelength agile laser source, the selection of the particular wavelength can be performed by a switching mechanism 72 and control unit 70 external to the laser cavity or intra-cavity to select the wavelength of each pulse emitted by the laser. Each adjacent pulse emitted by the laser could be for a different selected wavelength to create a sequence of pulses which, when combined, create the desired selective wavelengths for identification purposes. That switching mechanism could be in the form of an electro-optic or acousto-optic switch or modulator or it could be in the form of wavelength tunable filters or mirrors. In the case of an array of laser diodes, the control unit 70 and switch 72 could be used to supply power to and activate particular diodes in that array. A coded light beam delivery system from light source 74 to a diffuser system could be based on lens and/or mirror systems or a bundle of optical fiber 48 which feeds one or more optical diffuser heads 44'. The latter system is similar to the one described with respect to FIG. 3 and could include lens and/or mirrors along with diffusers. In this embodiment, as previously described with respect to FIG. 3, an optical or mechanical switching system 42' may be used to direct the selected wavelengths (combined) from the light source 74 to an appropriate emitting head in order to respond with a coded beam of selective wavelengths that is only emitted in a direction that covers the area in which an interrogation source is located.

Although the invention has been described with reference to several specific embodiments, various modifications may be made to those preferred embodiments without departing from the spirit and scope of the invention as defined in the appended claims. For example, the detection unit 50 in FIGS. 1 to 3 could be replaced by night vision goggles or a video camera which observes a scene though the three same selective filters 52 as in unit 50 to detect a tunable optical beacon 10 flashing at the wavelengths of interest.

The embodiments of the invention in which an exclusive property or privilege is claimed are defined as follows:

1. An optical identification friend-or-foe system for vehicles comprising a selective wavelength tunable optical beacon located on each of the vehicles, wherein the tunable optical beacon for one vehicle includes a light source and wavelength encoder with means to select narrow-band wavelengths from the light source for emission from the beacon, which selected wavelengths form an identification code for said one vehicle, and means to direct said selected wavelengths from said light source and wavelength encoder to at least one diffuser comprising means to irradiate an area in a wide field-of-view around said one vehicle with those selected wavelengths.

2. An optical identification friend-or-foe system for vehicles as defined in claim 1, wherein the light source is one that emits a broad continuous range of wavelengths and the means to select narrow-band wavelengths is said encoder having means to form a number of narrow-band optical filters with means to position selective optical filters in an optical path for a light beam from said source and said means to direct said selected wavelengths from said light source and wavelength encoder to said at least one diffuser.

3. An optical identification friend-or-foe system for vehicles as defined in claim 2, wherein said encoder is a disk and said means to form a number of narrow-beam optical filters is a number of individual rotatable concentric annular rings in the disk, each ring containing a number of narrow-band optical filters that can be individually positioned in said optical path by rotation of a ring, a number of said annular rings being located in said optical path whereby a selected number of selected optical filters can be positioned in said optical path.

4. An optical identification friend-or-foe system for vehicles as defined in claim 3, wherein the disk is rotatable to form sequentially coded identification words of various selected narrow-band wavelengths by rotation of the disk to place a number of combinations of narrow-band optical filters selectively in said optical path, each combination being located along a narrow sector of the disk.

5. An optical identification friend-or-foe system for vehicles as defined in claim 3, wherein the means to direct said selected wavelengths from said light source and wavelength encoder to said at least one diffuser is a lens in an optical path for light beams from the optical filters for said selected wavelengths, said at least one diffuser comprising a plurality of diffusers and the lens focusing said light beams onto ends of an optical fiber bundle where another end of each optical fiber is optically connected to one of said diffusers, diffusers being arranged to cover a 360° field-of-view in combination with each other.

6. An optical identification friend-or-foe system for vehicles as defined in claim 2, wherein the means to form a number of narrow-beam optical filters is a linearly variable optical filter and an adjacent superimposed liquid crystal display which are positioned in said optical path, and wherein the liquid crystal display can form a selected number of transparent slit apertures at selected positions along the linearly variable optical filter to transmit selected narrow-band wavelengths to said means to direct said selected wavelengths from said light source and wavelength encoder to said at least one diffuser.

7. An optical identification friend-or-foe system for vehicles as defined in claim 6, wherein the means to direct said selected wavelengths is a lens in an optical path for light beams from said slit apertures, said at least one diffuser comprising a plurality of diffusers and the lens focusing said light beams onto ends of an optical fiber bundle where another end of each optical fiber is optically connected to one of said diffusers, said diffusers being arranged to cover a 360° field-of-view in combination with each other.

8. An optical identification friend-or-foe system for vehicles as defined in claim 1, wherein said one vehicle includes a narrow beam interrogation means and a narrow field-of-view detection unit for an optical beacon directed in the same direction as said narrow beam and a panoramic detector on said one vehicle for detecting interrogation beams transmitted by other vehicles, the narrow field-of-view detection unit comprising a series of photodetectors, each coupled to a lens and a narrow-band optical filter for each of the selected wavelengths to form a separate channel for each of said selected wavelength; outputs from said photodetectors being supplied, via amplifiers, to inputs of an electronic processing unit that has means to verify that any detected narrow-band wavelengths correspond with a predetermined code.

9. An optical identification friend-or-foe system for vehicles as defined in claim 2, wherein said one vehicle includes a narrow beam interrogation means and a narrow field-of-view detection unit for an optical beacon directed in the same direction as said narrow beam and a panoramic detector on said one vehicle for detecting interrogation beams transmitted by other vehicles, the narrow field-of-view detection unit comprising a series of photodetectors, each coupled to a lens and a narrow-band optical filter for each of the selected wavelengths to form a separate channel for each of said selected wavelength; outputs from said photodetectors being supplied, via amplifiers, to inputs of an electronic processing unit that has means to verify that any detected narrow-band wavelengths correspond with a predetermined code.

10. An optical identification friend-or-foe system for vehicles as defined in claim 3, wherein said one vehicle includes a narrow beam interrogation means and a narrow field-of-view detection unit for an optical beacon directed in the same direction as said narrow beam and a panoramic detector on said one vehicle for detecting interrogation beams transmitted by other vehicles, the narrow field-of-view detection unit comprising a series of photodetectors, each coupled to a lens and a narrow-band optical filter for each of the selected wavelengths to form a separate channel for each of said selected wavelength; outputs from said photodectors being supplied, via amplifiers, to inputs of an electronic processing unit that has means to verify that any detected narrow-band wavelengths correspond with a predetermined code.

11. An optical identification friend-or-foe system for vehicles as defined in claim 6, wherein said one vehicle includes a narrow beam interrogation means and a narrow field-of-view detection unit for an optical beacon directed in the same direction as said narrow beam and a panoramic detector on said one vehicle for detecting interrogation beams transmitted by other vehicles, the narrow field-of-view detection unit comprising a series of photodetectors, each coupled to a lens and a narrow-band optical filter for each of the selected wavelengths to form a separate channel for each of said selected wavelength; outputs from said photodetectors being supplied, via amplifiers, to inputs of an electronic processing unit that has means to verify that any detected narrow-band wavelengths correspond with a predetermined code.

12. An optical identification friend-or-foe system for vehicles as defined in claim 1, wherein the light source and wavelength encoder is a wavelength agile laser source and a control unit to select wavelengths emitted by said laser source, the laser and control unit forming said means to select narrow-band wavelengths.

13. An optical identification friend-or-foe system for vehicles as defined in claim 1, wherein the light source and wavelength encoder is an array of laser diodes and control unit for a switching mechanism to select which diodes are to be activated, the diodes and control unit forming said means to select narrow-band wavelengths.

14. An optical identification friend-or-foe system for vehicles as defined in claim 9, wherein the means to direct said selected wavelengths from said light source and wavelength encoder to said at least one diffuser is a lens in an optical path for light beams from the optical filters that are positioned in said optical path for a light beam from said source, said at least one diffuser comprising a plurality of diffusers and the lens focusing said light beams onto ends of an optical fiber bundle where another end of each optical fiber is optically connected to one of said diffusers, said diffusers being arranged to cover a 360° field-of-view in combination with each other.

15. An optical identification friend-or-foe system for vehicles as defined in claim 14, wherein a switching mechanism is connected to the optical fiber bundle to only allow said light beams to be transmitted to one diffuser, said one diffuser irradiating a field-of-view in a direction towards an interrogation beam originating from another vehicle, the switching mechanism being controlled by said panoramic detector which has means to determine the direction from which an interrogation beam arrives from another vehicle, a means to determine a valid predetermined code from said interrogation beam and a means to activate said optical beacon in response to detecting a valid code.

16. An optical identification friend-or-foe system for vehicles as defined in claim 11, wherein the means to direct said selected wavelengths from said light source and wavelength encoder to said at least one diffuser is a lens in an optical path for light beams from the optical filters that are positioned in said optical path for a light beam from said source, said at least one diffuser comprising a plurality of diffusers and the lens focusing said light beams onto ends of an optical fiber bundle where another end of each optical fiber is optically connected to one of said diffusers, said diffusers being arranged to cover a 360° field-of-view in combination with each other.

17. An optical identification friend-or-foe system for vehicles as defined in claim 16, wherein a switching mechanism is connected to the optical fiber bundle to only allow said light beams to be transmitted to one diffuser, said one diffuser irradiating a field-of-view in a direction towards an interrogation beam originating from another vehicle, the switching mechanism being controlled by said panoramic detector which has means to determine the direction from which an interrogation beam arrives from another vehicle, a means to determine a valid predetermined code from said interrogation beam and a means to activate said optical beacon in response to detecting a valid code.

18. An optical identification friend-or-foe system for vehicles as defined in claim 1, wherein a light chopper is located in an optical path for a light beam from said source and said means to direct said selected wavelengths from said light source and said wavelength encoder to said at least one diffuser.

19. An optical identification friend-or-foe system for vehicles as defined in claim 2, wherein a light chopper is located in said optical path for a light beam from said source.

20. An optical identification friend-or-foe system for vehicles as defined in claim 2, wherein said one vehicle includes a narrow beam interrogation means and a narrow field-of-view detection unit for an optical beacon directed in the same direction as said narrow beam and a panoramic detector on said one vehicle for detecting interrogating beams transmitted by other vehicles, the narrow field-of-view detection unit comprising a narrow-band optical filter for each of said selected wavelengths and a video camera which observes a scene through said filters to detect transmitting optical beacons on other vehicles.

* * * * *